United States Patent Office 3,460,631
Patented Aug. 12, 1969

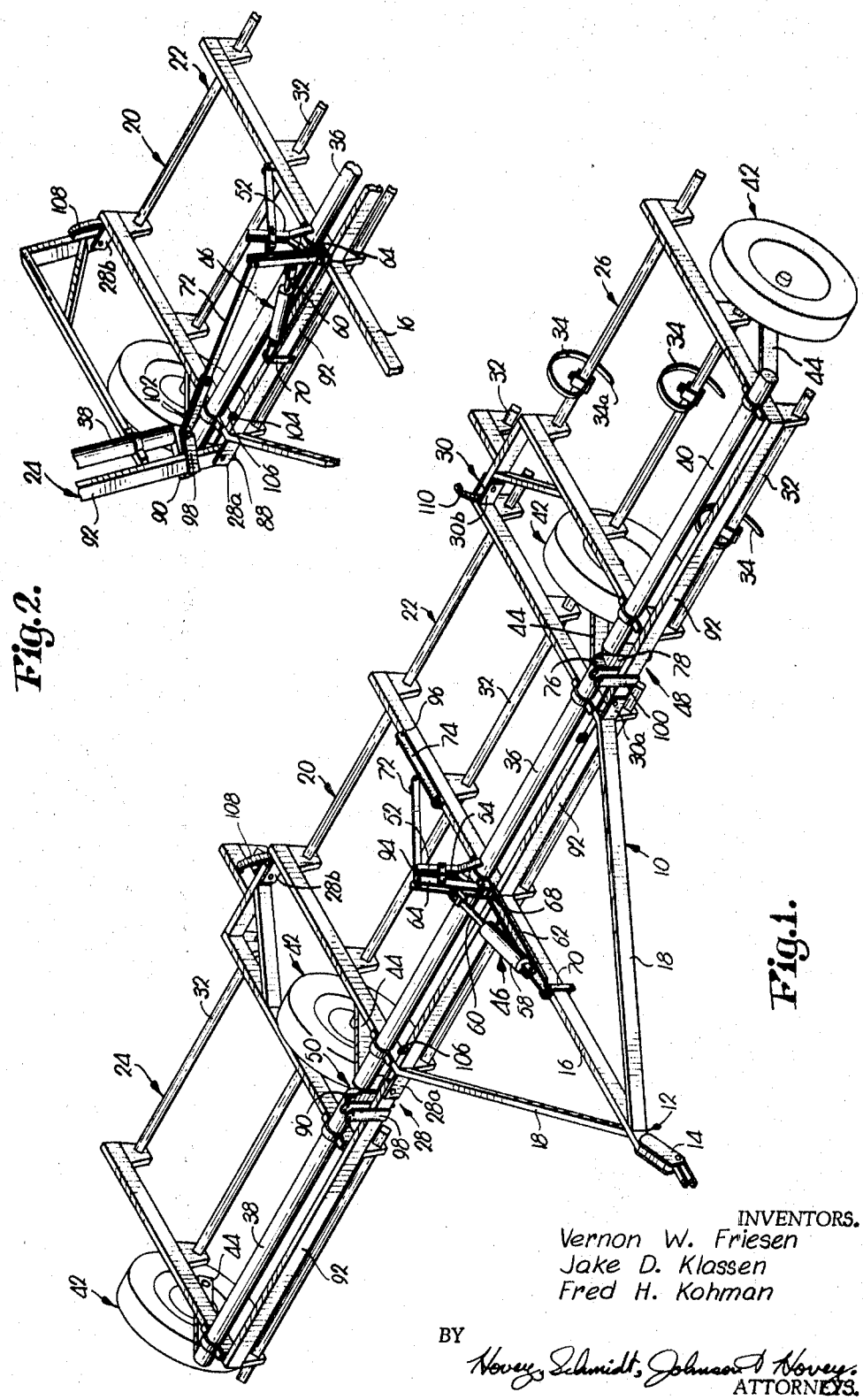

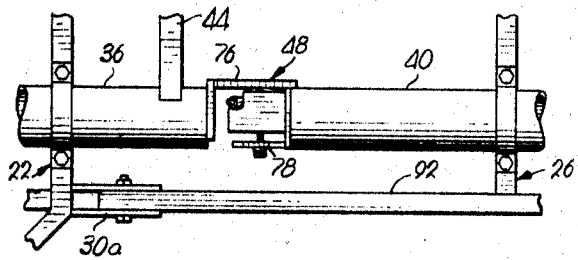
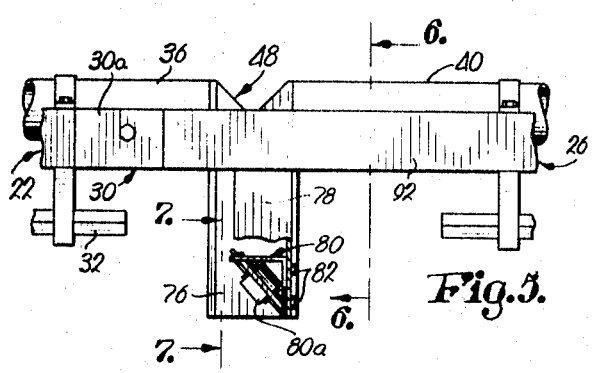
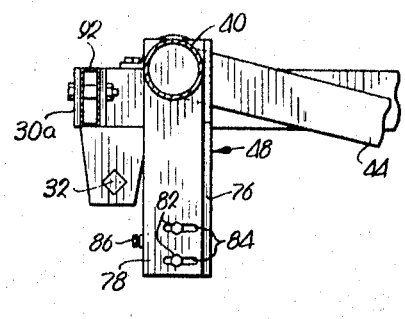
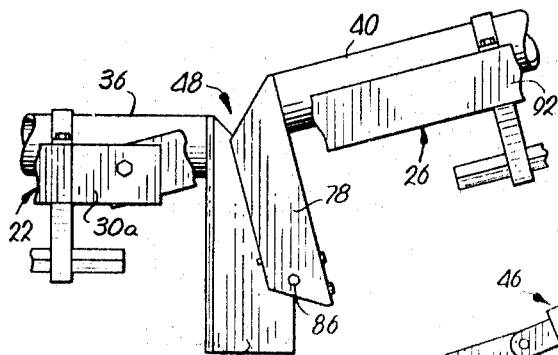
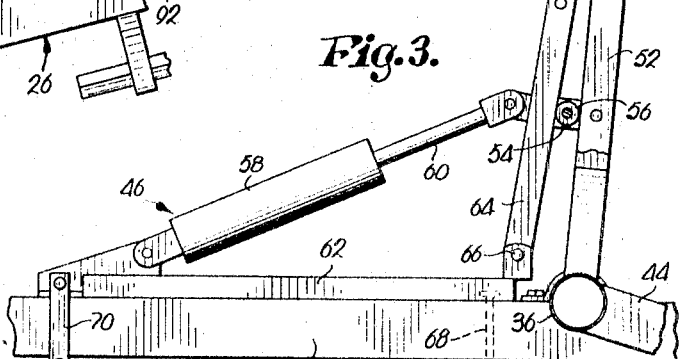
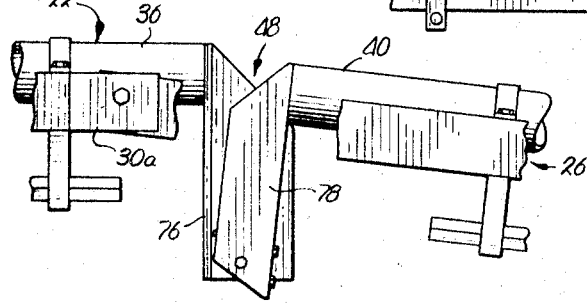
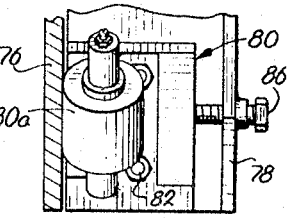

3,460,631
HIGH CLEARANCE WHEEL MOUNTED
SPRING-TOOTH HARROW
Vernon W. Friesen, Jake D. Klassen, and Fred H. Kohman, Hillsboro, Kans., assignors to Friesen Industries, Incorporated, Hillsboro, Kans., a corporation of Kansas
Filed Nov. 14, 1966, Ser. No. 593,946
Int. Cl. A01b 19/04, 19/10, 23/04
U.S. Cl. 172—311       7 Claims

ABSTRACT OF THE DISCLOSURE

An agricultural implement includes a wheel-supported frame having a main section and a pair of articulated end sections which may be folded upwardly to facilitate over-the-road movement. Agricultural tools mounted on the frame are shifted as a unit by a power driven shaft that changes the position of the wheel assemblies with respect to the frame. The end sections and the main section are interlinked in a manner to permit upward and downward flexing of the end sections as uneven ground is traversed.

---

This invention relates to an improved farm implement of the type normally pulled by a tractor and, particularly, to an improved high clearance, wheel mounted, spring-tooth harrow having articulated end sections which are foldable upwardly to facilitate over-the-road transportation of the harrow.

It is the primary object of the instant invention to provide a farm implement of the type described comprising a foldable frame wherein the frame is unfolded to provide maximum width during operation, whereby the number of passes across the field being processed is substantially reduced because the width of an individual pass has been maximized. In this respect, the frame is folded to reduce the width of the same and facilitate over-the-road transportation of the same to a remote work site.

A very important object of the instant invention is to provide such a farm implement or mobile apparatus wherein the frame includes a main section and an end section articulated for up and down movement relative to the main section wherein each of the sections is vertically adjustable whereby the agricultural tool means mounted on each section respectively may be moved relatively toward and away from the ground. In this respect, it is an aim of the invention to provide such an apparatus wherein the tools on each section are maintained at substantially the same vertical height during the ground processing operation.

Another very important object of the instant invention is to interlink the sections of the apparatus whereby the vertical height of the sections may be adjusted simultaneously. Furthermore, a very important aim of the instant invention is the provision of such linkage which facilitates simultaneous vertical adjustment of the sections and yet, permits swinging of the outer section relative to the main section whereby the width of the unit is reduced for over-the-road transportation.

Yet another important object of the instant invention is the provision of such a farm implement wherein the sections are interlinked in a manner to permit upward and downward flexing of the end section relative to the center section without altering the disposition of the latter relative to the ground whereby rough and uneven ground, as well as obstacles in the path of the implement may be traversed by the latter while the agricultural tools are maintained in operative engagement with the ground. It is to be understood that the primary purpose of the instant invention in this respect is to provide a farm implement of the type described wherein the transverse shape of the implement is adjustable in conformity with the configuration of the ground surface in a direction lateral to the path of travel of the implement whereby the agricultural tools on each section are substantially maintained at a predetermined vertical height relative to the ground across the entire width of the pass.

A very important aim of the instant invention is the provision of a single prime mover for adjusting the vertical height of all of the sections simultaneously. Hence, the vertical disposition of all of the agricultural tool means on the apparatus are adjusted at the same time whereby the ground-engaging tips of the tools normally lie in a plane substantially parallel to the ground.

Yet another important object of the instant invention is to provide such an apparatus wherein the vertical heights of the sections are adjusted and the end sections are articulated into an over-the-road position by a common prime mover to the end that the efficiency of the apparatus is maximized and yet the cost of the same is minimized.

In the drawings:

FIGURE 1 is a perspective view of a farm implement comprising a mobile apparatus embodying the concepts and principles of the instant invention illustrating the apparatus in its unfolded, operational condition;

FIG. 2 is a fragmentary, perspective view of the apparatus of FIG. 1 wherein the left-hand section is illustrated in a position after having been articulated part way toward its over-the-road condition;

FIG. 3 is an enlarged, elevational, detail view of the power means in a position for adjusting the vertical height of the sections simultaneously;

FIG. 4 is an enlarged, detail plan view of the linkage between the sections facilitating simultaneous vertical adjustment of the same wherein the linkage is illustrated in the position thereof corresponding to the operational positioning of the sections;

FIG. 5 is an elevational view of the structure illustrated in FIG. 4;

FIG. 6 is an end elevational view, partly in section, taken along line 6—6 of FIG. 5;

FIG. 7 is an enlarged, detail view taken along line 7—7 of FIG. 5;

FIG. 8 is a view of the structure illustrated in FIG. 5, certain parts having been broken away for increased clarity, wherein the structure is shifted upwardly by an upward flexing of the outer frame section during traversal of uneven terrain; and FIG. 9 is a view similar to FIG. 8 wherein the structure has been shifted during downward flexing of the outer frame section.

Mobile apparatus presenting a farm implement in the nature of a high clearance, wheel mounted, spring-tooth harrow is broadly designated by the numeral 10 and is illustrated in FIG. 1. Apparatus 10 includes a yoke assembly 12 comprising a hitch 14 adapted to be coupled to the rear of a tractor (not shown) or the like, a drawbar 16, and a pair of angularly disposed stabilizers 18.

Apparatus 10 also includes an articulated frame 20 comprising a main section 22 rigid with assembly 12, and a pair of outer sections 24 and 26 swingably mounted on opposite ends of section 22 for up and down movement about parallel axes extending fore and aft of apparatus 10 defined by hinge structures 28 and 30 respectively. It is to be noted that hinge structure 28 has a front hinge 28a and a rear hinge 28b, while structure 30 has corresponding front and rear hinges 30a and 30b.

Each section includes a plurality of transversely polygonal, elongated mounting rods 32 for carrying a number of agricultural tool means in the nature of a spring-tooth 34. It is to be understood that each rod 32 carries a number of teeth such as those identified by the numeral 34;

however, the majority of these teeth have been deleted from the drawings for increased clarity. Elements in the nature of shafts 36, 38 and 40 are mounted on sections 22, 24 and 26 respectively for rotation about a common axis traversing the fore and aft path of travel of apparatus 10 when the sections 22, 24 and 26 and the shafts 36, 38 and 40 are in their normal positions as illustrated in FIG. 1. In this respect, it is to be noted that sections 22, 24 and 26 are disposed in end-to-end relationship in the normal condition of the apparatus 10 illustrated in FIG. 1, and likewise, shafts 36, 38 and 40 are disposed in end-to-end realtionship in FIG. 1.

Apparatus 10 includes a plurality of wheel and axle assemblies 42. Crank arms 44, extending radially from their respective shafts 36, 38 or 40, provide means connecting respective assemblies 42 to the outboard ends of shafts 38 and 40, and to opposite ends of shaft 36 as can be seen viewing FIG. 1.

It can be seen, viewing FIG. 1, that clockwise rotation of shafts 36, 38, and 40 will swing arms 44 in a direction to move assemblies 42 relatively away from sections 22, 24 and 26, thus raising frame 20 and the teeth 34 thereon. Conversely, counterclockwise rotation of shafts 36, 38 and 40 will swing arms 44 to move assemblies 42 toward frame 20, thereby lowering the latter and causing teeth 34 to operably engage the ground. It is to be noted that if the counterclockwise rotation of shafts 36, 38 and 40 were unimpeded, the weight of frame 20 would move the same downwardly toward assemblies 42 thus causing shafts 36, 38 and 40 to rotate in a counterclockwise direction relative to sections 22, 24 and 26.

Power means in the nature of a piston and cylinder assembly 46 is provided for rotating shaft 36 in a clockwise direction to raise teeth 34 out of the ground. Structure 48 is provided between shafts 36 and 40 for imparting a clockwise rotation on shaft 40 upon clockwise rotation of shaft 36. Similarly, structure 50 is provided between shafts 36 and 38 for imparting a clockwise rotation on shaft 38 during corresponding clockwise rotation of shaft 36. Hence, when shaft 36 is rotated in a clockwise direction, assemblies 42 will be simultaneously moved away from frame 20 thereby raising the latter.

A lever 52 extends generally upwardly from shaft 36 as can best be seen viewing FIG. 3. Lever 52 has a pair of opposed, lateral extensions 54 thereon mounting a roller 56 therebetween. Assembly 46 includes a cylinder 58, a piston rod 60, a mounting plate 62, and an arm 64 operably connected with piston rod 60 and swingably mounted on plate 62 for rotation about pivot pin 66 as can best be seen viewing FIG. 3.

Assembly 46 is pivotally mounted on drawbar 16 for rotation about the axis of a pivot shaft 68, and a bracket 70 is provided for releasably securing assembly 46 on drawbar 16. Upon actuation of assembly 46, piston rod 60 is extended, thereby swinging arm 64 in a clockwise direction about the axis of pin 66. Arm 64 engages roller 56—hence lever 52 and thereby shaft 36 are also rotated in a clockwise direction upon actuation of piston and cylinder assembly 46. It can be seen that an extension 72 is swingably mounted on the free end of arm 64. Further, a link 74 is swingably mounted on section 22. The purpose for extension 72 and link 74 will be explained hereinafter. It is to be appreciated that lever 52, along with extensions 54 and roller 56, provides means for coupling piston and cylinder assembly 46 to shaft 36 for rotating the latter in a clockwise direction (FIG. 1). Upon rotation of shaft 36, shafts 38 and 40 are also rotated in a clockwise direction through the action of structures 48 and 50. Upon continued clockwise rotation of shafts 36, 38 and 40, wheel and axle assemblies 42 move relatively away from frame 20 and teeth 34 are raised out of the ground.

Piston and cylinder assembly 46 may include either a double-acting or a single-acting cylinder. For purposes of the preferred embodiment described in this specification, a single-acting cylinder has been selected. When hydraulic fluid is bled from cylinder 58, piston rod 60 is free to retract. The weight of frame 20 continually urges assemblies 42 toward frame 20 thus imparting a counterclockwise torque on shaft 36. Thus, lever 52 is urged toward arm 64 and, because rod 60 is free to retract, arm 64 is swung in a counterclockwise direction (FIG. 3) until hydraulic fluid is no longer bled from cylinder 58. During the operation of apparatus 10, frame 20 is lowered in the manner described above until the free ends 34a of teeth 34 are in engagement with the ground whereby the latter is harrowed. When ends 34a are disposed in operational engagement with the ground, structure 48 will be disposed approximately as shown in FIGS. 4, 5 and 6. It is to be understood that structure 50 is a mirror image of structure 48 and thus, only the latter will be described in particularity.

Structure 48 includes a pair of interengageable, elongated members 76 and 78 which are rigid to and extend laterally from respective shafts 36 and 40. Viewing FIG. 5, it can be seen that members 76 and 78 have longitudinal axes extending radially from respective shafts 36 and 40 and members 76 and 78 are disposed in relatively overlapped relationship. Member 78 includes an antifriction device in the nature of a roller and axle assembly 80 and it can be seen viewing FIG. 5 that assembly 80 includes a roller 80a rotatable about an axis which extends through the axis defined by hinge 30a. Viewing FIGS. 4, 5 and 6 it can be seen that the longitudinal axes of members 76 and 78 are vertical when ends 34a of teeth 34 are in operative engagement with the ground. In this respect, it is to be understood that members 76 and 78 are movable into and out of the vertical positions illustrated in FIGS. 5 and 6 where the members 76 and 78 depend from respective shafts 36 and 40 upon rotation of shafts 36 and 40.

Viewing FIGS. 8 and 9, the action of structure 48 to permit upward and downward flexing of frame section 26 with respect to section 22 is illustrated. During such flexing, generally caused by uneven terrain or obstacles on the ground, section 26 swings about the axis presented by hinge 30a and thus, member 78 swings relative to member 76. Roller 80a of member 78 is in engagement with member 76 and because roller 80a rotates about an axis which extends through the axis of flexing, binding is precluded and member 78 moves smoothly with respect to member 76. Viewing FIGS. 6 and 7, it can be seen that assembly 80 is adjustably mounted on member 78. Clamp screws 82 extend through elongated slots 84 permitting assembly 80 to be moved toward and away from member 76. Setscrew 86 establishes the position of assembly 80 and then clamp screws 82 are tightened to maintain assembly 80 in a fixed position with respect to member 78.

Frame 20 of apparatus 10 is articulated so that the width of the same may be reduced to permit over-the-road transportation. Of course, it is to be understood that ends 34a of teeth 34 must be raised out of the ground to permit such over-the-road transportation. Assembly 46 is actuated to extend rod 60, thereby rotating shafts 36, 38 and 40 in a clockwise direction to move wheel and axle assemblies 42 away from frame 20, thereby raising ends 34a of teeth 34 out of the ground. Manifestly, during the rotation of shafts 36, 38 and 40, members 76 and 78 of structure 48 (and the corresponding members 88 and 90 of structure 50) move out of the vertical position shown in FIGS. 5 and 6 toward the forwardmost frame members 92 of sections 22, 24 and 26 respectively. Thus, member 90 will be disposed relatively above the corresponding member 88 while member 78 is disposed above its corresponding member 76.

It can be seen viewing FIG. 1, that lever 52 comprises a pair of spaced sections presenting a space 94 therebetween. After piston rod 60 has been extended to rotate shaft 36, lever 52 is disposed in the position indicated in FIG. 2. Link 74 is swung forwardly on section 22 and into space 94, and a pin 96 is inserted through aligned holes in link 74 and lever 52 presenting means for interconnecting section 22 and shaft 36 for maintaining teeth 34 out of the ground. Thus, piston and cylinder assembly 46 is no longer needed to counteract the counterclockwise torque on shaft 36 caused by the weight of frame 20.

Bracket 70 may now be disconnected from drawbar 16 whereby assembly 46 is swung about the axis of shaft 68 and into the position indicated in FIG. 2. Of course, extension 72 must be lifted out of space 94 to facilitate the swinging of assembly 46. The fluid pressure on cylinder 58 is released to permit retraction of piston rod 60 and extension 72 is connected to a bracket 98 on section 24. Manifestly, a bracket 100 is provided on section 26 for the same purpose as bracket 98 on section 24, it being understood that assembly 46 is swingable from the position shown in FIG. 2 through an arc of 180° to facilitate lifting of section 26.

After extension 72 is connected with bracket 98, assembly 46 is actuated to extend piston rod 60, thereby elevating section 24 into an over-the-road position. FIGURE 2 illustrates frame 20 after section 24 has been raised beyond a predetermined distance and it can be seen that members 88 and 90 are no longer in engagement. Members 88 and 90 are permitted to move out of engagement during the raising of section 24 because member 90 is disposed above member 88 after shafts 36 and 38 have been rotated in a direction to raise teeth 34 out of engagement with the ground.

Viewing FIG. 2, it can be seen that, upon further extension of piston rod 60, section 24 will be swung to a position with hole 102 in bracket 98 aligned with hole 104 in a clip 106 on frame member 92 of section 22. Hence, section 24 is maintained in its over-the-road position by inserting a pin through openings 102 and 104. In its over-the-road position, section 24 has been moved about the axis of hinges 28a and 28b until the center of gravity of section 24 is disposed to the right of the axis of hinges 28a and 28b. A small leaf spring 108 is provided to move the center of gravity of section 24 back to the left of the axis of hinges 28a and 28b when section 24 is again to be lowered into an operative position. Viewing FIG. 1, it can be seen that a spring 110 similar to spring 108 is provided to facilitate the lowering of section 26 in the manner just described for the lowering of section 24.

Novel devices such as structures 48 and 50 permit the use of an articulated frame such as 20 wherein the outboard sections are supported by an adjustable wheel and axle assembly and yet full articulation of the outer sections is possible. Frame sections 24 and 26 are fully supported by their assemblies 42 so that the position of the teeth such as 34 thereon is accurately controlled. A single piston and cylinder assembly 46 has been provided for simultaneously adjusting the position of sections 22, 24 and 26 relative to the ground. Although sections 22, 24 and 26 are moved simultaneously into an operative position, each outer section 24 or 26 is fully swingable on section 22 to permit flexing of frame 20 during the traversal of uneven terrain and the like. Furthermore, each of the sections 24 and 26 is fully articulable into an over-the-road position permitting rapid transportation of apparatus 10 from site to site. Thus, it can be seen that all of the objects, purposes and aims of the instant invention have been fulfilled in a substantial sense.

Having thus described the invention, what is claimed as new and desired to be secured by Letters Patent is:

1. In a mobile apparatus,
a frame having a pair of sections, articulated for up and down movement of one of the sections about an axis extending fore and aft of the apparatus;
a wheel and axle assembly for each section respectively;
an element mounted for rotation on each section respectively,
said elements having a normal position on a common axis of rotation traversing the fore and aft path of travel of the apparatus,
said sections and said elements having an end-to-end relationship when the elements are in said normal position,
each element having means connecting the same with the corresponding assembly for raising the frame upon rotation of the elements in one direction about said common axis; and
structure between said elements for imparting rotation to one of the elements upon rotation of the other element in said one direction,
said structure including a pair of interengageable members, one on each element respectively,
said members being movable out of interengagement when said one section is raised about said fore and aft axis a predetermined distance beyond said normal position.

2. The invention of claim 1,
and an antifriction device between the elements carried by one of said elements.

3. The invention of claim 1,
said members being rigid to and extending laterally outwardly from their elements and being relatively overlapped when in interengagement.

4. The invention of claim 3,
said members being elongated and having longitudinal axes extending radially from corresponding elements and being movable into and out of vertical positions depending from said elements during rotation of the latter.

5. The invention of claim 4,
agricultural tool means on said frame,
said tool means being in engagement with the ground when said longitudinal axes of the members are vertical.

6. The invention of claim 5,
power means carried by the other of said sections;
means for coupling the power means with said other element for rotating the latter in said one direction to a position raising the tool means out of the ground; and
means for coupling the power means with said one section for moving the latter about said fore and aft axis to an over-the-road position extending upwardly from said other section.

7. The invention of claim 6,
and means for interconnecting said other element and said other section for maintaining the tool means out of the ground during movement of said one section to said over-the-road position.

References Cited

UNITED STATES PATENTS

| | | | |
|---|---|---|---|
| 2,995,385 | 8/1961 | Lohrman et al. | 280—412 |
| 3,256,942 | 6/1966 | Van Sickle et al. | 172—310 |
| 3,362,483 | 1/1968 | Twidale | 172—311 |

ANTONIO F. GUIDA, Primary Examiner

STEPHEN C. PELLEGRINO, Assistant Examiner

U.S. Cl. X.R.

280—411